(12) United States Patent
Sharpe-Geisler

(10) Patent No.: US 6,353,352 B1
(45) Date of Patent: Mar. 5, 2002

(54) CLOCK TREE TOPOLOGY

(75) Inventor: Bradley A. Sharpe-Geisler, San Jose, CA (US)

(73) Assignee: Vantis Corporation, Sunnyvale, CA (US)

( * ) Notice: Subject to any disclaimer, the term of this patent is extended or adjusted under 35 U.S.C. 154(b) by 0 days.

(21) Appl. No.: 09/199,664

(22) Filed: Nov. 25, 1998

(51) Int. Cl.$^7$ ................................................. H03K 3/00
(52) U.S. Cl. ........................ 327/295; 327/293; 327/565; 326/47; 326/101; 257/208
(58) Field of Search ................................. 327/291, 293, 327/295, 297, 565, 564; 257/786, 208–211; 326/93, 101, 47

(56) References Cited

U.S. PATENT DOCUMENTS

| | | | | |
|---|---|---|---|---|
| 5,272,694 A | * | 12/1993 | Bourgart et al. | 370/296 |
| 5,656,963 A | * | 8/1997 | Masleid et al. | 327/297 |
| 5,691,662 A | | 11/1997 | Soboleski et al. | 327/292 |
| 5,717,229 A | | 2/1998 | Zhu | 257/208 |
| 6,006,025 A | * | 12/1999 | Cook et al. | 716/14 |

OTHER PUBLICATIONS

Ting–Hai Chao, et al., IEEE Transactions on Circuits and Systems–II: Analog and Digital Signal Processing, "Zero Skew Clock Routing with Minimum Wirelength," vol. 39, No. 11, Nov. 1992, pp. 799–814.
Patent Abstracts of Japan, vol. 1996, No. 06, Jun. 28, 1996 & JP 08 044776 A Feb. 16, 1996, abstract.
Patent Abstracts of Japan, vol. 018, No. 556, Oct. 24, 1994 & JP 06 204435 A Jul. 22, 1994, abstract.

* cited by examiner

*Primary Examiner*—Timothy P. Callahan
*Assistant Examiner*—Minh Nguyen
(74) *Attorney, Agent, or Firm*—Fliesler Dubb Meyer & Lovejoy LLP

(57) ABSTRACT

A clock tree topology distributes a clock signal from a single input terminal 400 to three terminals 421–423 with an equal phase delay. The topology includes four lines 401–404 connected together at a first end 450 with adjacent lines forming right angles. A second end of the line 404 forms the clock signal input terminal 400. A second end of the remaining lines 401–403 are connected to first ends of lines 411–413. Second ends of the lines 411–413 form the terminals 421–423. A right angle is formed between each of the lines 401–403 and the respective one of the lines 411–413 to which it connects.

7 Claims, 7 Drawing Sheets

CLOCK TREE TOPOLOGY

BACKGROUND OF THE INVENTION

1. Field of the Invention

The present invention relates to a topology for a system of transmission lines for delivering a clock signal from one terminal to other terminals with an equal phase delay.

2. Description of the Related Art

FIG. 1 shows a topology for a standard clock tree. In FIG. 1, a signal is provided to the clock tree at a single terminal 100. The clock tree then distributes the signal to four terminals 101–104 over equal line lengths to achieve equal phase delays. The standard clock tree is made up of units composed of six line segments 111–116 in the shape of the letter "H" as shown in FIG. 1. Multiple "H" shaped units may be linked together to form a clock tree for distributing a clock signal to more terminals as shown in FIG. 2. Using the "H" shaped units to form a clock tree, a single clock signal can be distributed to $4^N$ terminals with an equal phase delay, wherein N is an integer.

Clock trees are useful in devices such as field programmable gate arrays (FPGAs). FIG. 3 shows a block diagram illustrating components of a typical FPGA. As shown, the typical FPGA includes input/output buffers (IOBs), an array of configurable logic blocks (CLBs), and routing resources. The I/O buffers are arranged around the perimeter of the device and provide an interface between internal components of the FPGA and external package pins. The routing resources include signal lines and other components such as multiplexers for interconnecting the I/O buffers and CLBs.

Each CLB includes a series of look up tables. Each look up table in a CLB includes a number of memory cells and a decoder. Inputs to a look up table are decoded by the decoder to select one of the memory cells for connecting to its output. The memory cells can be programmed so that the look up table can be configured to operate as an AND gate, OR gate, or other gate providing a Boolean function. Each look up table typically has three or four inputs provided from routing resources of the FPGA, and a single output line provided to the routing resources of the FPGA.

The output of each look up table can be registered and receive a common clock signal to enable synchronous operation with other look up tables, either in the same CLB or other CLBs. Because look up tables in different CLBs may be located a significant distance apart, a single clock signal line driving the registers of both look up tables will experience a significant phase delay between the look up tables preventing synchronous operation.

To prevent phase delays and provide synchronous operation in a FPGA, a clock signal is typically distributed to the CLBs using a clock tree as shown in FIG. 1 or FIG. 2. Output terminals of the clock tree such as 101–104 are each provided to a separate CLB or an IOB. With a clock tree made up of "H" shaped units as shown in FIGS. 1 or 2, the number of destinations which can be supported is $4^4$.

SUMMARY OF THE INVENTION

The present invention provides a clock tree topology which will support a number other than $4^N$ destinations.

Referring to FIG. 4, the clock tree topology of the present invention includes a single input terminal 400 and distributes the clock signal to three terminals 421–423 with an equal phase delay. The topology includes four lines 401–404 connected together at a connection node 450 with adjacent lines forming right angles. A second end of the line 404 forms the clock signal input terminal 400. A second end of the remaining lines 401–403 are connected to first ends of lines 411–413. Second ends of the lines 411–413 form the terminals 421–423 which may be connected to CLBs. A right angle is formed between each of the lines 401–403 and the respective one of the lines 411–413 to which it connects.

To optionally connect to other numbers of CLBs than can be done with the topology of FIG. 4, the present invention further includes a combination of the structure of FIG. 4 with the "H" type structure of FIG. 1 to form the clock tree topology shown in FIG. 6.

BRIEF DESCRIPTION OF THE DRAWINGS

Further details of the present invention are explained with the help of the attached drawings in which.

DETAILED DESCRIPTION

Figure 4:
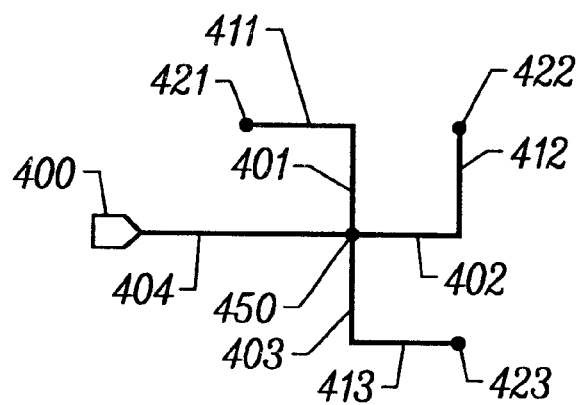
FIG. 4 shows a clock tree topology of the present invention.

FIG. 4 shows a clock tree topology of the present invention. The clock tree topology receives a clock signal at an input terminal 400 and distributes the clock signal to three terminals 421–423 with an equal phase delay. The topology includes four lines 401–404 connected together at a first end 450 with adjacent lines forming right angles. A second end of the line 404 forms the clock signal input terminal 400. A second end of the remaining lines 401–403 are connected to first ends of lines 411–413. Second ends of the lines 411–413 form the terminals 421–423. A right angle is formed between each of the lines 401–403 and the respective one of the lines 411–413 to which it connects. The length of the lines 401–403 and 411–413 are set so that the distance between connection node 450 and any of the terminals 421–423 is substantially equal. With equal line lengths from the connection node 450 to each of the terminals 421–423, the phase of a signal provided from the input 400 to the terminals 421–423 will be equal.

Figure 5:
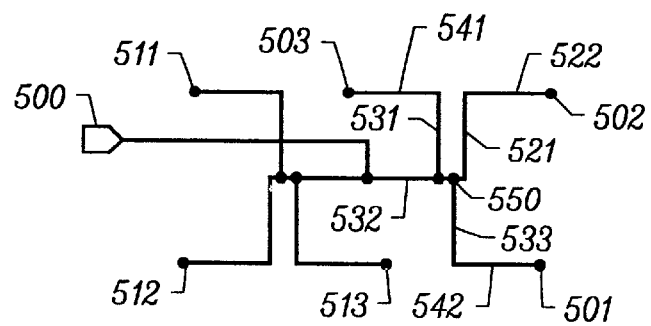
FIG. 5 shows an alternative clock tree topology of the present invention.

FIG. 5 illustrates an alternative clock tree topology of the present invention. The clock tree topology receives a clock signal at the input terminal 500 and distributes the clock signal to two groups of three terminals 501–503 and 511–513 with substantially an equal phase delay. The configuration of lines to distribute the signal from input 500 to terminals 501–503 is similar to the configuration of FIG. 4, but with lines 521 and 522 located differently than lines 402 and 412 to allow circuitry to be placed in the position of lines 402 and 412. The topology of FIG. 5 includes four lines 531–533 and 521 connected together with three of the lines 531–533 forming a right angle with at least one other adjacent line. A fourth line 521, unlike with the topology in FIG. 4, runs parallel to two of the other three lines 531–533, in this case lines 531 and 533. A second end of the line 532 is connected to the clock input terminal 500. A second end of lines 521, 531 and 533 are connected to first ends of lines 522, 541 and 542. Second ends of lines 522, 541 and 542 form the terminals 501–503. A right angle is formed between each of the lines 521, 531 and 533 and the respective one of lines 522, 541 and 542 to which it connects. The length of the lines 521, 531, 542, 522, 541 and 542 are set so that the distance between the connection node 550 and any of the terminals 501–503 is substantially equal.

In FIG. 5, the lines feeding terminals 511–513 are shown to illustrate that the line configurations with the topology feeding terminals 501–502 can be configured to provide terminals 501–503 and 511–513 in a rectangular fashion. The topology of FIG. 4 can similarly be configured to feed an array of six terminals in a rectangular area.

Figure 6:
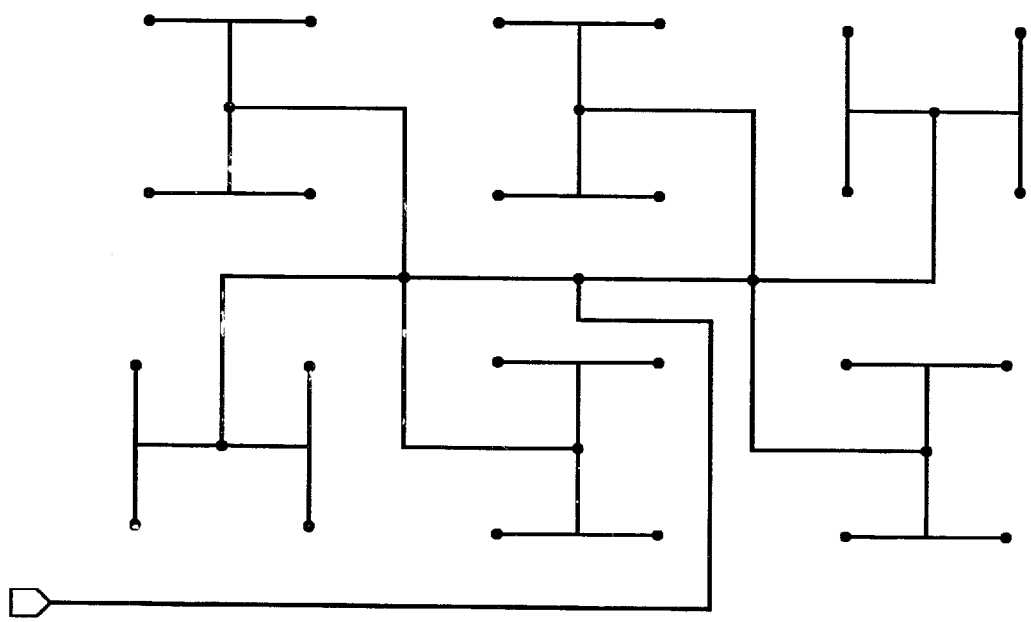
FIG. 6 shows an alternative clock tree topology for the present invention including the topology of FIG. 4 combined with the topology of FIG. 1.

The present invention further includes a topology as shown in FIG. 6 to optionally distribute a clock signal to a number of terminals other than can be done with the topology of FIG. 4 or 5. Note the topology of FIG. 4 or FIG. 5 will feed $(2 \times 3)^K$ terminals, where K is an integer. Note also that when K is even the terminals along the periphery of the clock tree form a square, and when K is odd the terminals along the periphery form a 2×3 aspect ratio. The topology of FIG. 6 includes a combination of the structure of FIG. 4 or FIG. 5 with the "H" type structure of FIG. 1. A combination of the topology shown in FIG. 4 along with the "H" type structure of FIG. 1 forms a clock tree topology is shown in FIG. 6. The structure of FIG. 6 connects to a number of terminals totaling $(2 \times 3)^K \times 4^N$, where K and N are integers.

Figure 1:
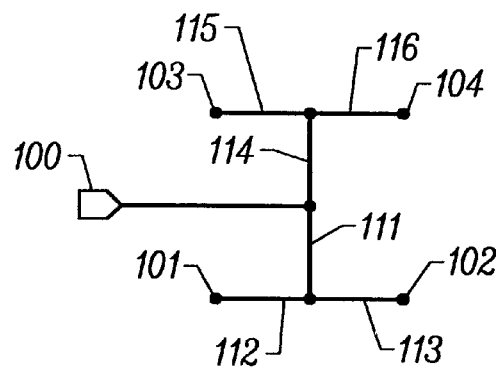
FIG. 1 shows a topology for a standard clock tree.
Figure 2:
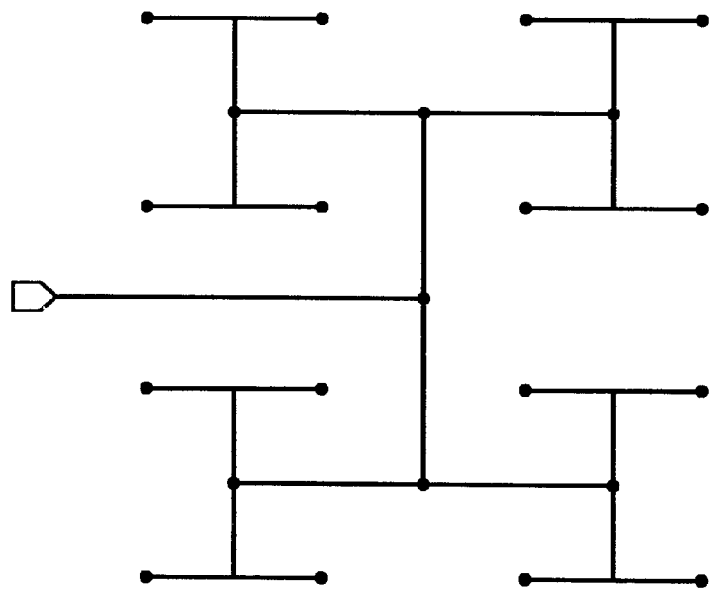
FIG. 2 shows a topology for a standard clock tree using multiple "H" shaped units.
Figure 3:
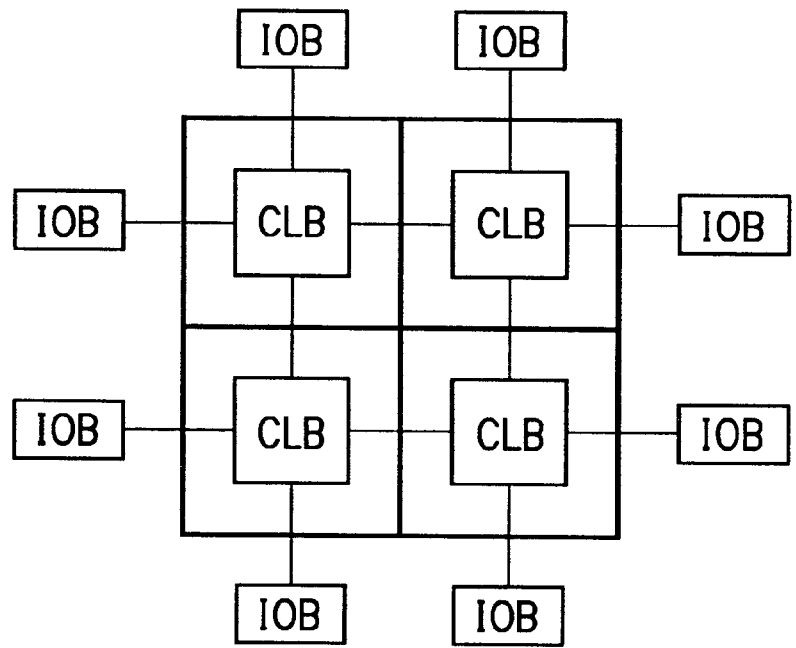
FIG. 3 shows a block diagram illustrating components of a typical FPGA.
Figure 7:
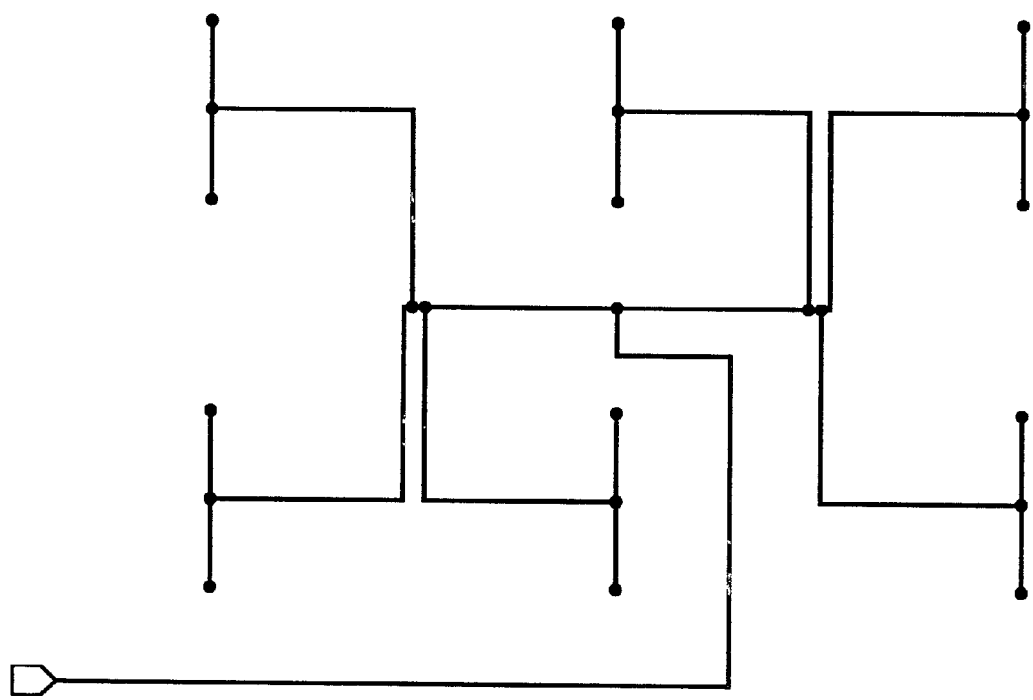
FIG. 7 shows another clock tree topology including the topology of FIG. 5 combined with a portion of the topology of FIG. 1.

FIG. 7 shows another clock tree topology embodiment for the present invention including the topology of FIG. 5 combined with a portion of the topology of FIG. 1. The topology of FIG. 5 uses only the lines 111 and 114 of the "H" structure of FIG. 1 to feed $2^N$ points as opposed to $4^N$ points with the entire "H" structure. The structure of FIG. 7 then connects to a number of terminals totaling $(2 \times 3)^K \times 2^N$, where K and N are integers. With K and N both being even, the topology of FIG. 7 routes to a square array of points with $(2 \times 3)^K/2 \times 2^N/2$ points per edge. With K even and N odd, the structure will be rectangular with a 2×1 aspect ratio. With K odd and N even, the structure will be rectangular with a 2×3 aspect ratio. With both K and N odd, the structure will be rectangular with a 4×3 aspect ratio.

Figure 8A:
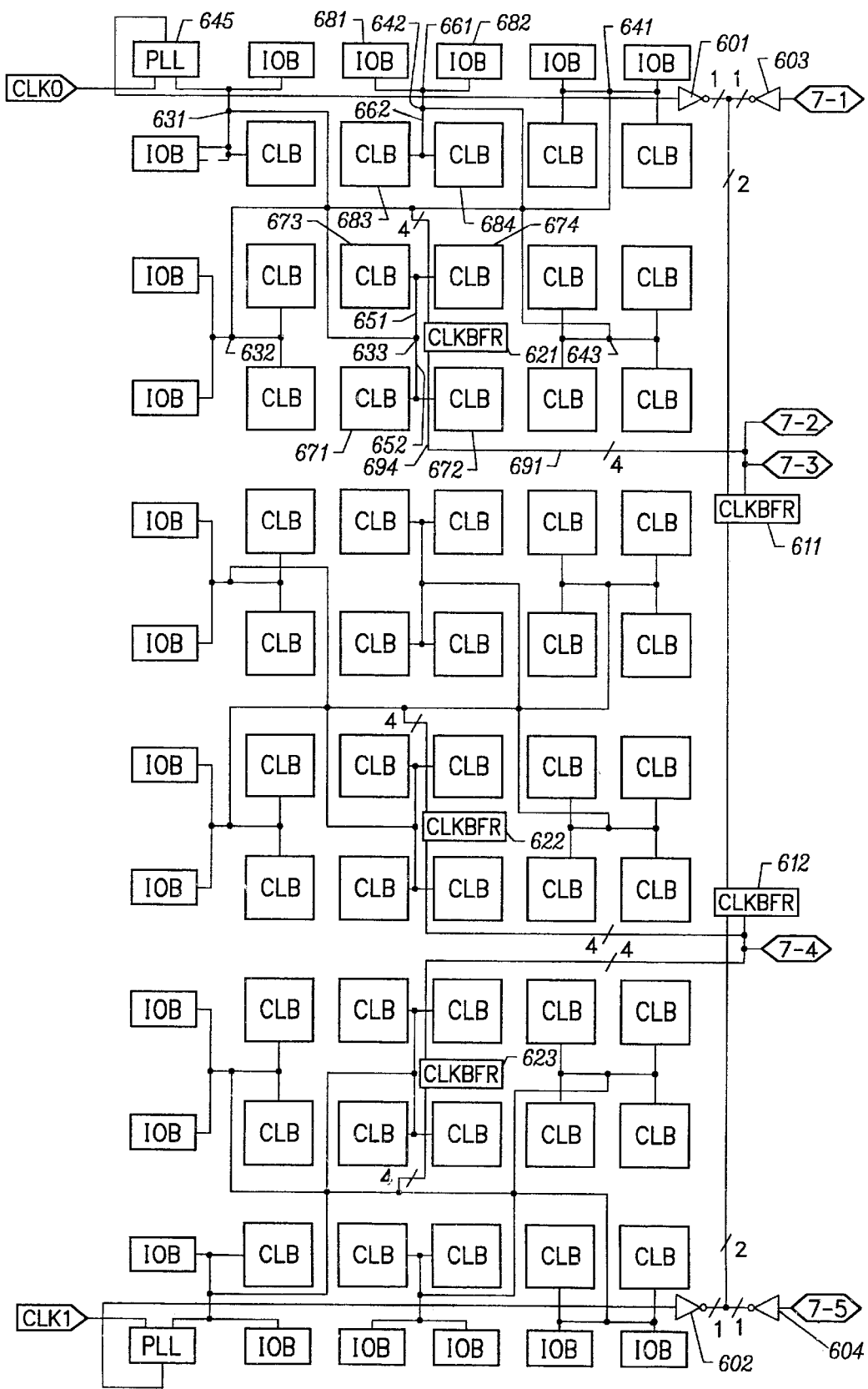
FIGS. 8A–8B illustrate the use of the clock tree topology of the present invention on an FPGA containing a 10×10 array of CLBs.
Figure 8B:
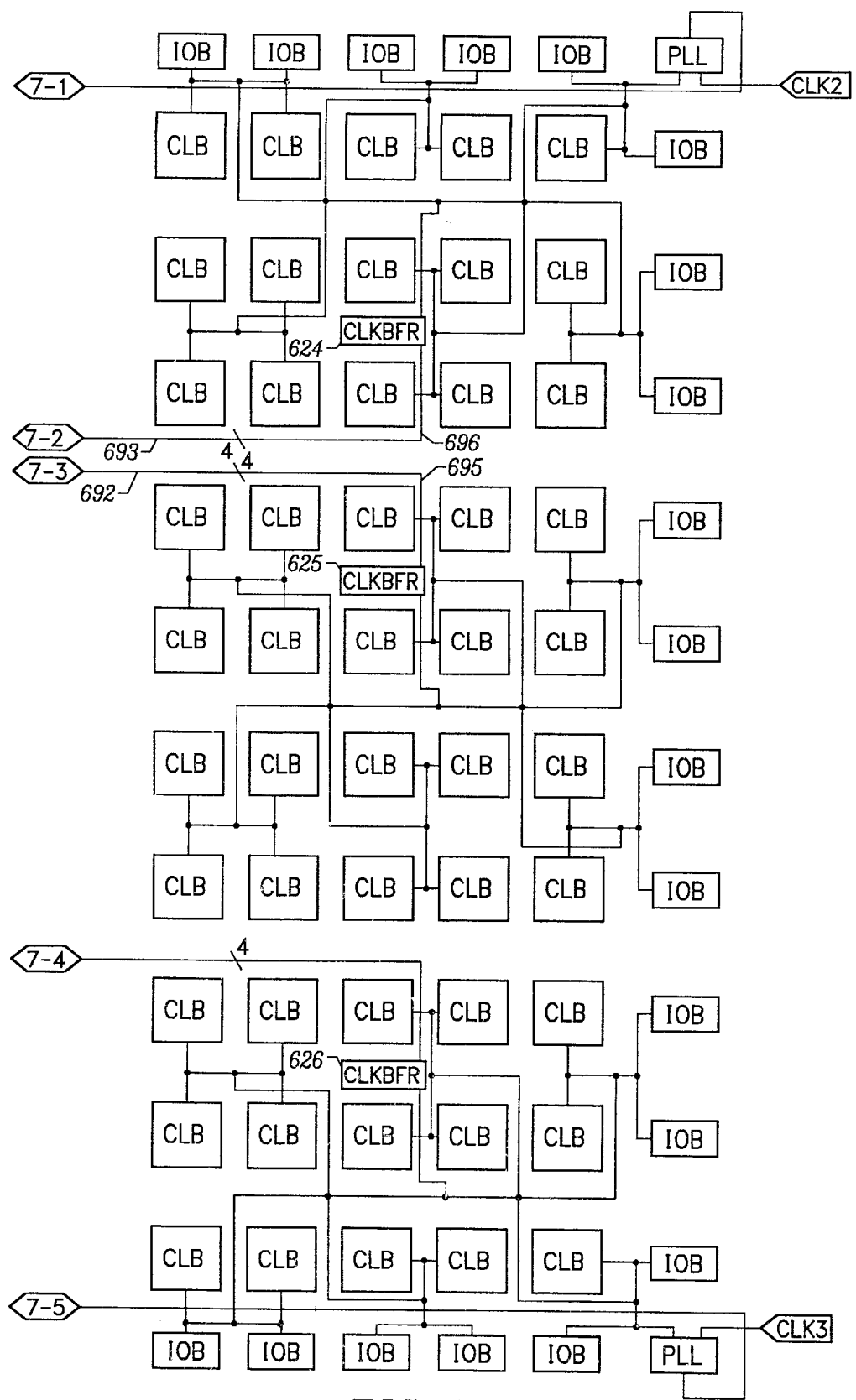

FIGS. 8A–8B illustrate the use of the clock tree topology of the present invention on an FPGA containing a 10×10 array of CLBs. The FPGA includes four clock input pins CLK0–CLK3, two of which are shown in FIG. 8A (CLK0 and CLK1), and two of which are shown in FIG. 8B (CLK2 and CLK3). Each of the clock pins are provided to a phase locked loop (PLL), and the output of each PLL is provided through a respective buffer 601–604 to buffers 611 and 612. The buffers 611 and 612 distribute all four clock signals to buffers 621–626. Each of the buffers 621–626 then distribute all four clock signals to IOBs and CLBs in a portion of the FPGA using a clock tree topology of the present invention.

For example, the four clock lines from the clock buffer 621 are distributed to a first set of terminals 631–633 using the clock tree topology shown in FIG. 4. "H" type structures connected to the terminals 631–633 then distribute the clock signals with an equal phase delay to IOBs and CLBs as shown. Similarly, the four clock lines from the buffer 621 are also distributed to a second set of terminals 641–643 using a topology as shown in FIG. 4. "H" type structures then connect the terminals 641–643 to IOBs and CLBs as shown.

The distance from the connection terminal 633 to the CLBs 671–674 is substantially the same. Similarly, the distance from the connection terminal 642 to the IOBs 681–682 and CLBs 683–684 is substantially the same. Although, the lines 651 and 652 leading from the terminal 633 have the same length, the lines 661 and 662 leading from terminal 642 do not have equal lengths. The lines connecting line 661 to the IOBs 681 and 682 are longer than the lines connecting the line 662 to the CLBs 683 and 684 so that the total line length from the terminal 642 to the IOBs 681 and 682 and the CLBs 683 and 684 is substantially the same.

FIGS. 8A–8B also illustrate the use of the clock tree topology of FIG. 5. The clock signals from buffers 611 and 612 are provided to buffers 621–626 using the configuration of FIG. 5. For instance, the signal from clock buffer 611 is provided to lines 691–693, which have a configuration similar to lines 533, 521 and 531 of FIG. 5. Lines 691–693 then are connected to lines 694–696, similar to the connection of lines 533, 521 and 531 to respective lines 542, 522 and 541 in FIG. 5.

To assure that the clock signals provided to IOBs and CLBs are in phase with the clock signals CLK1–CLK3 at the lead pins of the FPGA, one terminal of a clock tree topology may be provided to a second input of a PLL instead of a CLB or an IOB. For instance, the clock tree topology provided from buffer 621 has a terminal connected to a second input of the PLL 645 which receives the CLK0 lead pin. The PLL 645 then functions to maintain all the CLK0 output terminals of the clock trees in phase with the CLK0 signal received at the lead pin. With such phase locking, synchronization of outputs of the CLBs can be maintained with components of other chips receiving the same clock CLK0 signal.

Figure 9:
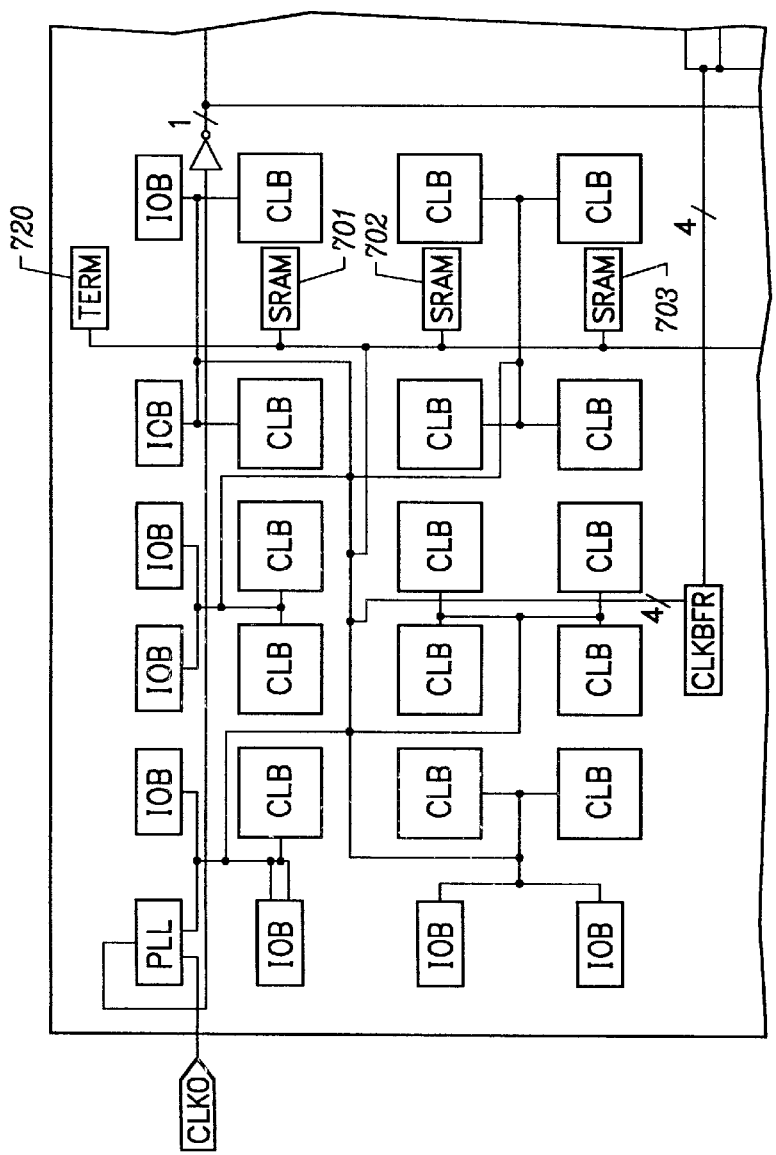
FIG. 9 shows a portion of the FPGA of FIGS. 8A–8B with static random access memory cells separating the CLBs.

FIG. 9 shows a portion of the FPGA of FIGS. 8A–8B with static random access memory (SRAM) blocks 701–703 separating the columns of CLBs. With such SRAM blocks included between CLBs, the spacing between the CLBs will not be equal. Those CLBs to the right of 701–703 have a longer lead in. To compensate, extra routing is included in each CLB which can be optionally disconnected or bypassed when connecting those CLBs to the clock tree.

With the SRAM blocks added in the area shown in FIG. 9, the line feeding the SRAM blocks 701–703 does not have an equal loading on both ends with the SRAM blocks 701–703. To compensate for any resulting phase mismatch, the present invention includes a termination such as 720. The termination 720 includes extra wiring and active components, such as an inverter, so that the line segment feeding element 701 has a load matching the line segment connecting SRAM blocks 702 and 703.

Figure 10:
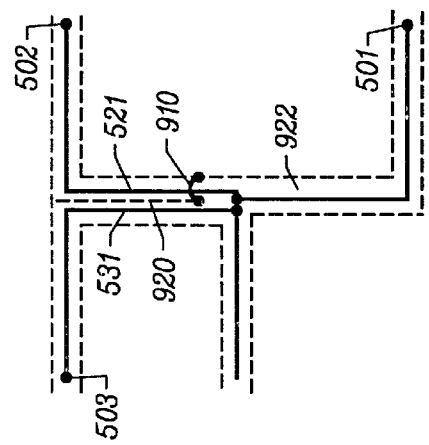
FIG. 10 illustrates the use of ground or Vcc lines to shield a clock tree topology from noise.

To limit noise on the clock lines, the clock lines are preferably surrounded by a ground or Vcc line as shown in FIG. 10. FIG. 10 includes a portion of the clock tree topology of FIG. 5 feeding terminals 501–503. The dashed lines represent the ground or Vcc lines used to isolate the clock tree lines. Because the dashed line between clock tree lines 521 and 531 will terminate, a via is provided from dashed line 920 and line 922, and a jumper 910 is used to connect the lines 920 and 922. Without the jumper 910, the line 920 will provide a capacitive noise shield, but will not prevent inductive coupling. Jumper 910 enables line 910 to be continuous to provide inductive noise shielding.

The clock tree of the present invention preferably overlaps the power and/or ground distribution bus of the chip. The power and ground distribution bus passes both horizontally and vertically over the columns and rows of CLBs. At every opportunity, the shield wires shown in FIG. 10 as dashed lines are preferably connected to the ground and/or power distribution bus. In a preferred embodiment, the power and ground lines of the distribution bus run under, over and/or adjacent to the clock tree lines over most of the length of the clock tree. The shield wires are connected whenever they cross the power and/or ground bus. Such connections create local loops running alongside, between and beyond the clock lines to give optimal shielding.

In an alternative embodiment, a ground plane layer is included as a layer of the integrated circuit on a separate layer from the clock tree and shielding lines of FIG. 10. A via from the dashed lines in FIG. 10 to the ground plane enables the lines to provide inductive noise shielding. Although the dashed lines are shown in FIG. 10 with the topology of FIG. 5, such lines used to eliminate noise are also preferably provided with the other topologies described in this application.

Although the topology of FIG. 4 or the topology of FIG. 5 can be selectively used based on the whether clearance for the clock lines are provided around other structures in a circuit, the structure of FIG. 5 may prove advantageous over FIG. 4 in some circumstances. For instance, in some manufacturing processes, one layer of metal lines having a first thickness is used for all horizontal lines, while another layer of metal lines having a second thickness is used for all vertical lines. To connect the horizontal and vertical lines vias are provided between layers. The structure of FIG. 4 has horizontal and vertical lines such as 401, 402 and 403 connected together which need to provide the same phase length. With different thickness horizontal and vertical lines, the phase lengths of the lines will be different. With the topology of FIG. 5, lines which need to be the same length are all either horizontal or all vertical, making the topology of FIG. 5 more advantageous under these conditions.

If the total number of terminals required by an application doesn't fit the number of terminals supported by one of the clock tree topologies described above, then the next larger tree is used, and either dummy terminations are added to the unused terminals to balance the load, or the tree is trimmed. To trim a tree an inverter must be inserted at the trim point. An inverter must be inserted at the same relative point for every branch. Hence, how the tree is trimmed determines how the inverters along the tree are deployed. Using this scheme, an efficient clock tree can be created for any regular array of points.

Although the present invention has been described above with particularity, this was merely to teach one of ordinary skill in the art how to make and use the invention. Many additional modifications will fall within the scope of the invention, as that scope is defined by the claims which follow.

What is claimed is:

1. A system of signal transmission lines for distributing a signal at a first terminal to additional terminals with substantially equal phase delays, the system comprising:
a pair of distribution circuits, each comprising:
first, second, third, and fourth lines each having a first end and a second end, wherein the first end of the first, second, third, and fourth lines are all connected together; and
fifth, sixth, and seventh lines each having a first end and a second end, wherein a first end of each of the fifth, sixth, and seventh lines are connected to the second end of a respective one of the first, second, and third lines,
wherein the second end of the fourth line from each of the pair of distribution circuits are connected together at an initial node,
wherein the second, third and fourth lines have a substantially equal length,
wherein the fifth, sixth, and seventh lines have a substantially equal length, and
wherein the initial node and the second end of one of the fifth, sixth and seventh lines from a first one of the pair of distribution circuits, and the second end of one of the fifth, sixth and seventh lines from a second one of the pair of distribution circuits lie in a substantially straight line.

2. The system of claim 1,
wherein the second end of the fourth line from each of the pair of distribution circuits are connected together to form the first terminal, and
wherein the second end of each of the first, second, and third transmission lines form the additional terminals.

3. A system of signal transmission lines for distributing a signal at a first terminal to additional terminals with substantially equal phase delays, the system comprising:
a pair of distribution circuits, each comprising:
first, second, third, and fourth lines each having a first end and a second end, wherein the first end of the first, second, third, and fourth lines are all connected together; and
fifth, sixth, and seventh lines each having a first end and a second end, wherein a first end of each of the fifth, sixth, and seventh lines are connected to the second end of a respective one of the first, second, and third lines,
wherein the second end of the fourth line from each of the pair of distribution circuits are connected together, and
wherein substantially right angles are formed between adjacent ones of the first, second, third, and fourth lines, and no portions of two adjacent ones of the first, second and third lines are collinear.

4. The system of claim 3, wherein a substantially right angle is formed between each of the first, second, and third lines and a respective one of the fifth, sixth and seventh lines to which it connects.

5. A system of signal transmission lines for distributing a signal at a first terminal to additional terminals with substantially equal phase delays, the system comprising:
a pair of distribution circuits, each comprising:
first, second, third, and fourth lines each having a first end and a second end, wherein the first end of the first, second, third, and fourth lines are all connected together; and
fifth, sixth, and seventh lines each having a first end and a second end, wherein a first end of each of the fifth, sixth, and seventh lines are connected to the second end of a respective one of the first, second, and third lines,
wherein the second end of the fourth line from each of the pair of distribution circuits are connected together at an initial node, wherein the second, third and fourth lines have a substantially equal length, wherein the fifth, sixth, and seventh lines have a substantially equal length, wherein the initial node and the second end of one of the fifth, sixth and seventh lines from a first one of the pair of distribution circuits, and the second end of one of the fifth, sixth and seventh lines from a second one of the pair of distribution circuits lie in a substantially straight line, and wherein each of the pair of distribution circuits further comprises binary tree circuits, each binary tree circuit being connected at one of a plurality of connection terminals to one of the second ends of the fifth, sixth and seventh transmission lines in each of the pair of distribution circuits, the binary tree circuits each comprising:

a first pair of lines with each of the first pair of lines having a first end and a second end, wherein the first ends of the first pair of lines are connected together to one of the connection terminals;

a second pair of lines with each of the second pair of lines having a first end and a second end, wherein the first ends of the second pair of lines are connected together and to the second end of a first one of the lines in the first pair; and a third pair of lines with each of the third pair of lines having a first end and a second end, wherein the first ends of the third pair of lines are connected together and to the second end of a second one of the lines in the first pair.

6. The system of claim 5, wherein each of the first, second, and third pair of lines include substantially colinear lines; and wherein the second and third pair of lines include lines perpendicular to lines of the first pair of lines.

7. The system of claim 5, wherein the first pair of lines have equal lengths, wherein lines in the second and third pair of lines all have equal lengths.

* * * * *